US012645122B2

(12) United States Patent
Greer et al.

(10) Patent No.: US 12,645,122 B2
(45) Date of Patent: Jun. 2, 2026

(54) INSULATED GLAZING UNIT INCLUDING AN INTEGRATED SENSOR

(71) Applicant: SAGE ELECTROCHROMICS, INC., Faribault, MN (US)

(72) Inventors: Bryan D. Greer, Northfield, MN (US); Ahoo Malekafzali Ardakan, Cottonwood Heights, UT (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 576 days.

(21) Appl. No.: 17/930,396

(22) Filed: Sep. 7, 2022

(65) Prior Publication Data

US 2023/0072059 A1      Mar. 9, 2023

Related U.S. Application Data

(60) Provisional application No. 63/241,215, filed on Sep. 7, 2021.

(51) Int. Cl.
| | |
|---|---|
| *G02F 1/157* | (2006.01) |
| *F21V 14/00* | (2018.01) |
| *G02B 26/00* | (2006.01) |
| *G02F 1/15* | (2019.01) |
| *G02F 1/153* | (2006.01) |
| *G09G 3/19* | (2006.01) |

(52) U.S. Cl.
CPC .......... *G02F 1/153* (2013.01); *G02F 2203/01* (2013.01)

(58) Field of Classification Search
CPC .......... G02F 1/155; G02F 1/0316; G02F 3/16; G02F 1/163; G02F 1/1523; G02F 1/1525; G02F 1/1521; G02F 1/1533; G02F 1/03; B60R 1/088; C09K 9/02; H04N 9/3137; H04N 9/22

USPC ................ 359/265–275, 279, 245–247, 242; 345/49, 105, 107; 250/70; 348/814, 817; 438/929; 349/182–186
See application file for complete search history.

(56) References Cited

U.S. PATENT DOCUMENTS

| | | | | | |
|---|---|---|---|---|---|
| 6,039,390 | A | * | 3/2000 | Agrawal | G02F 1/133308 296/211 |
| 8,777,431 | B2 | | 7/2014 | Blank et al. | |
| 10,663,832 | B1 | * | 5/2020 | Nagel | G02F 1/153 |
| 2006/0018000 | A1 | * | 1/2006 | Greer | G02F 1/163 359/265 |
| 2012/0265350 | A1 | | 10/2012 | Ashdown | |
| 2014/0067733 | A1 | | 3/2014 | Humann | |

(Continued)

FOREIGN PATENT DOCUMENTS

| | | | |
|---|---|---|---|
| EP | 1110123 | B1 | 11/2002 |
| KR | 1020180029977 | A | 3/2018 |

(Continued)

OTHER PUBLICATIONS

International Search Report for PCT/US2022/076066, dated Jan. 10, 2023, 3 pages.

*Primary Examiner* — Dawayne Pinkney
(74) *Attorney, Agent, or Firm* — Abel Schillinger, LLP; Robert Young

(57) ABSTRACT

A insulated glazing unit is disclosed. The insulated glazing unit can include a first panel, a second panel, an electrochromic device coupled to the first panel, and one or more sensors. The one or more sensors can be located within a sealed space defined by the spacer, the first panel, and the second panel.

18 Claims, 5 Drawing Sheets

(56)                    References Cited

U.S. PATENT DOCUMENTS

| | | |
|---|---|---|
| 2016/0348420 A1 | 12/2016 | Veerasamy |
| 2017/0097259 A1 | 4/2017 | Brown et al. |
| 2018/0364539 A1* | 12/2018 | Rozbicki .............. E06B 3/6722 |
| 2018/0364541 A1* | 12/2018 | Turner ................... G02F 1/155 |
| 2019/0036480 A1* | 1/2019 | Barr ..................... H10F 19/807 |
| 2019/0178807 A1 | 6/2019 | Bohn et al. |
| 2019/0196292 A1 | 6/2019 | Brown et al. |
| 2019/0235451 A1 | 8/2019 | Shrivastava et al. |
| 2019/0243206 A1* | 8/2019 | Brown ................ H04L 12/4625 |
| 2020/0026141 A1 | 1/2020 | Brown et al. |
| 2020/0074959 A1* | 3/2020 | Bhat ....................... G09G 5/02 |
| 2020/0096831 A1 | 3/2020 | Brown et al. |
| 2020/0209701 A1 | 7/2020 | Wang et al. |
| 2020/0301228 A1 | 9/2020 | Sarrach |
| 2020/0348790 A1* | 11/2020 | Vampola .............. G09G 3/3406 |
| 2021/0132458 A1 | 5/2021 | Trikha et al. |

FOREIGN PATENT DOCUMENTS

| | | |
|---|---|---|
| WO | 2016086017 A1 | 6/2016 |
| WO | 2023039443 A1 | 3/2023 |

* cited by examiner

100

110

115

120

121

125

122

130

105

INSULATED GLAZING UNIT INCLUDING AN INTEGRATED SENSOR

CROSS-REFERENCE TO RELATED APPLICATION(S)

This application claims priority under 35 U.S.C. § 119(e) to U.S. Provisional Application No. 63/241,215, entitled "INSULATED GLAZING UNIT INCLUDING AN INTEGRATED SENSOR," by Bryan D. GREER et al., filed Sep. 7, 2021, which is assigned to the current assignee hereof and incorporated herein by reference in its entirety.

FIELD OF THE DISCLOSURE

The present disclosure is directed to insulated glazing units that contain electrochromic devices, and more specifically to insulated glazing units and the control modules used in conjunction with the electrochromic devices.

BACKGROUND

An electrochemical device can include an electrochromic stack where transparent conductive layers are used to provide electrical connections for the operation of the stack. Electrochromic (EC) devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

EC devices have a composite structure through which the transmittance of light can be modulated. A typical layer solid-state electrochromic device in cross-section having the following superimposed layers: a first transparent conductive layer which serves to apply an electrical potential to the electrochromic device, an electrochromic electrode layer which produces a change in absorption or reflection upon oxidation or reduction, an electrolyte layer that allows the passage of ions while blocking electronic current, a counter electrode layer which serves as a storage layer for ions when the device is in the bleached or clear state, and a second transparent conductive layers which also serves to apply an electrical potential to the electrochromic device. EC devices can then be incorporated with various other elements to form an insulated glazing unit, including a control module which is connected to the electrochromic device by wires that run within the frame of the insulated glazing unit. The insulated glazing unit can then be installed within the frame of a window where the wires are out of view.

However, further improvements of insulated glazing units and window designs are desired.

BRIEF DESCRIPTION OF THE DRAWINGS

Embodiments are illustrated by way of example and are not limited in the accompanying figures.

Figure 1:
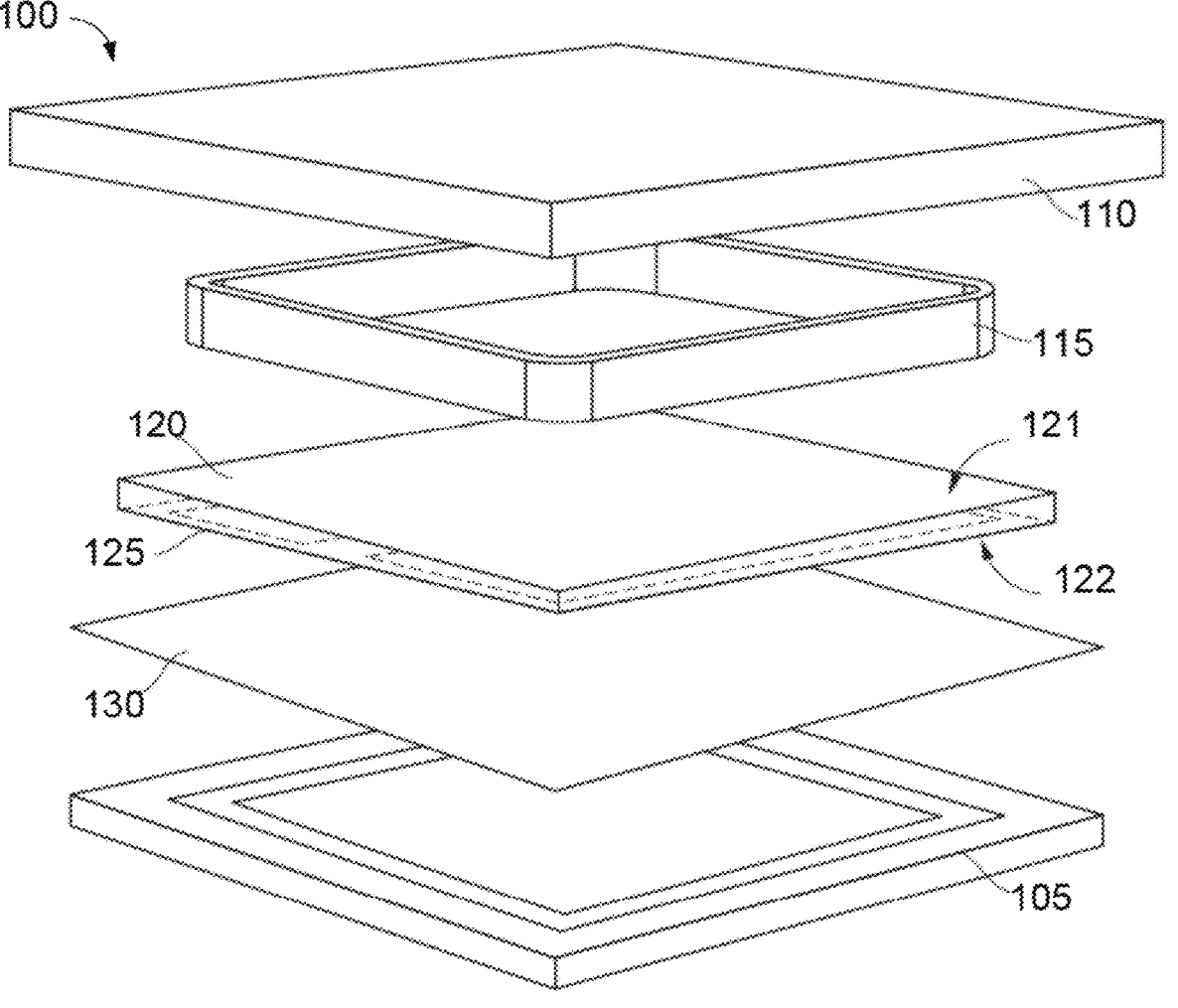
FIG. 1 is schematic illustration of an insulated glazing unit according to the embodiment of the current disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of the embodiments of the invention.

DETAILED DESCRIPTION

The following description in combination with the figures is provided to assist in understanding the teachings disclosed herein. The following discussion will focus on specific embodiments and implementations of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or.

The use of "over" is employed to describe elements and components described herein. This description includes variations meant to include layers which are or are not in direct contact with the others.

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

In an embodiment, an insulated glazing unit can include an electrochromic device on a substrate, an electrochromic stack, a support lite, a spacer between the substrate and support lite, and a sensor within a hermetically sealed area between the substrate and the support lite. The electrochromic stack can include an electrochromic layer or a counter electrode layer over the substrate, a first transparent conductive layer over the substrate, a second transparent conductive layer, an adhesion layer disposed between second transparent conductive layer and the counter electrode layer. Advantageously, having the sensor within the hermetically sealed area between the first spacer and the second spacer protects the sensor while providing weather conditions that are used to control the electrochromic device.

The embodiments as illustrated in the figures and described below help in understanding particular applications for implementing the concepts as described herein. The embodiments are exemplary and not intended to limit the scope of the appended claims.

FIG. 1 schematic illustration of an insulated glazing unit 100 according to the embodiment of the current disclosure. The insulated glazing unit 100 can include a first panel 105, an electrochemical device 120 coupled to the first panel 105, a second panel 110, and a spacer 115 between the first panel 105 and second panel 110. As will be discussed below with respect to FIG. 2, the insulated glazing unit 100 can also include one or more sensors between the first panel 105 and the second panel 110. The first panel 105 can be a glass panel, a sapphire panel, an aluminum oxynitride panel, or a spinel panel. In another embodiment, the first panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The first panel 105 may or may not be flexible. In a particular embodiment, the first panel 105 can be float glass or a borosilicate glass and have a thickness in a range of 2 mm to 20 mm thick. The first panel 105 can be a heat-treated, heat-strengthened, or tempered panel. In one embodiment, the electrochemical device 120 is coupled to first panel 105. In another embodiment, the electrochemical device 120 is on a substrate 125 and the substrate 125 is coupled to the first panel 105. In one embodiment, a lamination interlayer 130 may be disposed between the first panel 105 and the electrochemical device 120. In one embodiment, the lamination interlayer 130 may be disposed between the first panel 105 and the substrate 125 containing the electrochemical device 120. The electrochemical device 120 may be on a first side 121 of the substrate 125 and the lamination interlayer 130 may be coupled to a second side 122 of the substrate 125. The first side 121 may be parallel to and opposite from the second side 122.

The second panel 110 can be a glass panel, a sapphire panel, an aluminum oxynitride panel, or a spinel panel. In another embodiment, the second panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The second panel may or may not be flexible. In a particular embodiment, the second panel 110 can be float glass or a borosilicate glass and have a thickness in a range of 5 mm to 30 mm thick. The second panel 110 can be a heat-treated, heat-strengthened, or tempered panel. In one embodiment, the spacer 115 can be between the first panel 105 and the second panel 110. In another embodiment, the spacer 115 is between the substrate 125 and the second panel 110. In yet another embodiment, the spacer 115 is between the electrochemical device 120 and the second panel 110.

In another embodiment, the insulated glazing unit 100 can further include additional layers. The insulated glazing unit 100 can include the first panel 105, the electrochemical device 120 coupled to the first panel 105, the second panel 110, the spacer 115 between the first panel 105 and second panel 110, a third panel, and a second spacer (not shown) between the first panel 105 and the second panel 110. In one embodiment, the electrochemical device may be on a substrate. The substrate may be coupled to the first panel using a lamination interlayer. A first spacer may be between the substrate and the third panel. In one embodiment, the substrate is coupled to the first panel on one side and spaced apart from the third panel on the other side. In other words, the first spacer may be between the electrochemical device and the third panel. A second spacer may be between the third panel and the second panel. In such an embodiment, the third panel is between the first spacer and second spacer. In other words, the third panel is couple to the first spacer on a first side and coupled to the second spacer on a second side opposite the first side.

Figure 2:
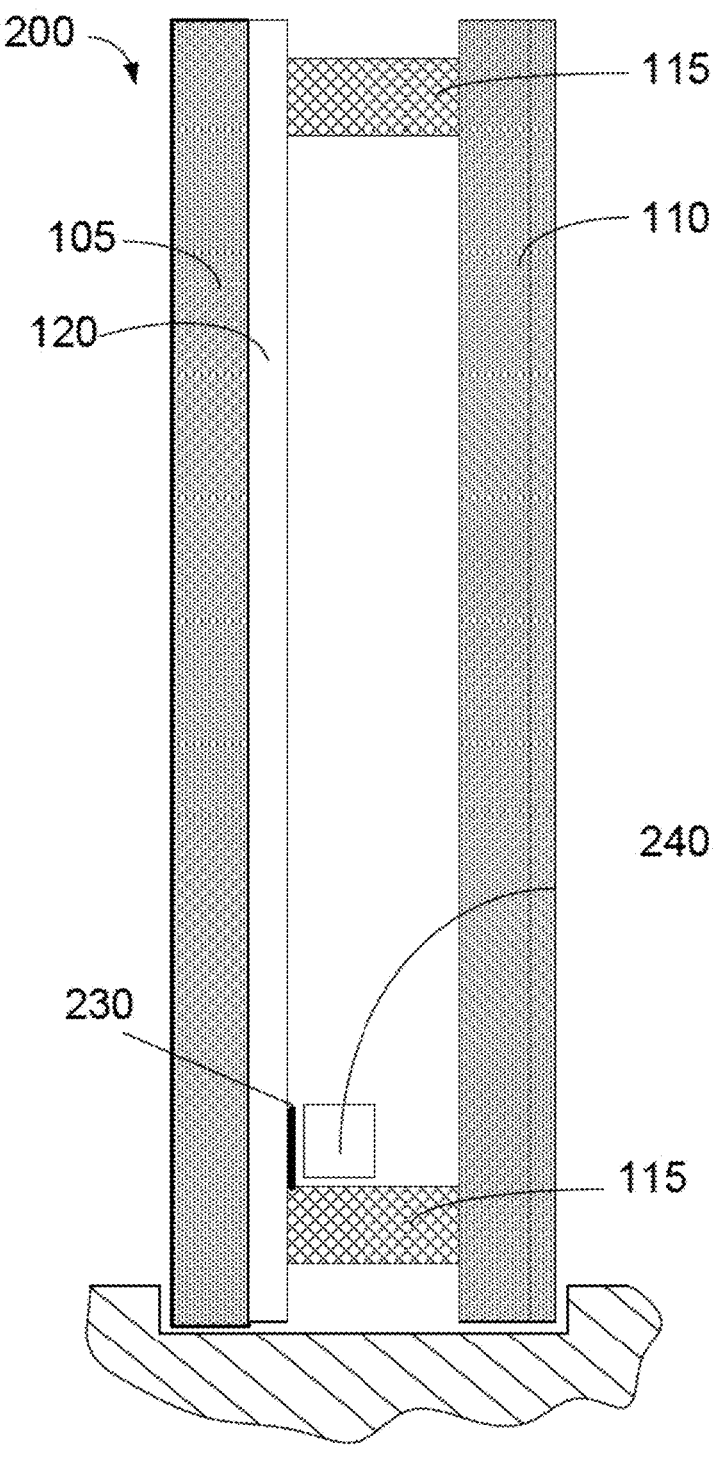
FIG. 2 is a schematic cross-section of an improved insulated glazing unit in accordance with an embodiment of the present disclosure.

FIG. 2 is a schematic cross-section of an improved insulated glazing unit (IGU) 200, in accordance with an embodiment of the present disclosure. The insulated glazing unit 200 can be similar to the insulated glazing unit 100 of FIG. 1 and as such the differences will be discussed in more detail below. The insulated glazing unit 200 can include a first panel 105, a second panel 110, an non-light-emitting, variable transmission device 120 coupled to the first panel 105, a first spacer 115 between the first panel 105 and second panel 110, an obscuration film 230, and a sensor 240. In one embodiment, the sensor 240 can be within a hermetically sealed space created by the spacer 115, the first panel 105, and the second panel 110. In another embodiment, the sensor 240 can be closer to the second panel 110 than to the first panel 105. In another embodiment, the sensor 240 can be closer to the first panel 105 than to the second panel 110, as seen in FIG. 2. In one embodiment, the sensor 240 can be spaced between 3 and 6 mm outside a visible viewing area. The visible viewing area can be defined by laser scribes and bus bars for the electrochromic device 120. In another embodiment, the sensor 240 can be closer to the edge or side of the electrochromic device 120 than to a center of the electrochromic device 120. In one embodiment, the sensor 240 is within 6 mm of the edge of the electrochromic device 120. In one embodiment, the sensor 240 can be both within and outside the visible viewing area.

In one embodiment, the obscuration film 230 can be between the sensor 240 and the electrochromic device 120. In one embodiment, the obscuration film 230 can be between the sensor 240 and the first panel 105. In another embodiment, the obscuration film 230 can be between the sensor 240 and the second panel 110. The obscuration film 230 can advantageously hide the sensor 240 from view of an observer and help the sensor blend into the framing system. In one embodiment, the obscuration film 230 can have an area that is between 80% and 95% an area of the sensor 240. In another embodiment, the obscuration film 230 can extend beyond the edge of the sensor 240. In another embodiment, the sensor 240 can be wider than the obscuration film 230.

Each non-light-emitting, variable transmission device can be connected to its corresponding controller via its own frame cable. The building management system can include logic to control the operation of building environmental and facility controls, such as heating, ventilation, and air conditioning (HVAC), lights, scenes for EC devices, including the EC device 120. The logic for the building management systems can be in the form of hardware, software, or firmware. In an embodiment, the logic may be stored in a field programmable gate array (FPGA), an application-specific integrated circuit (ASIC), a hard drive, a solid state drive, or another persistent memory. In an embodiment, the building management system may include a processor that can execute instructions stored in memory within the building management system or received from an external source.

Figure 3:
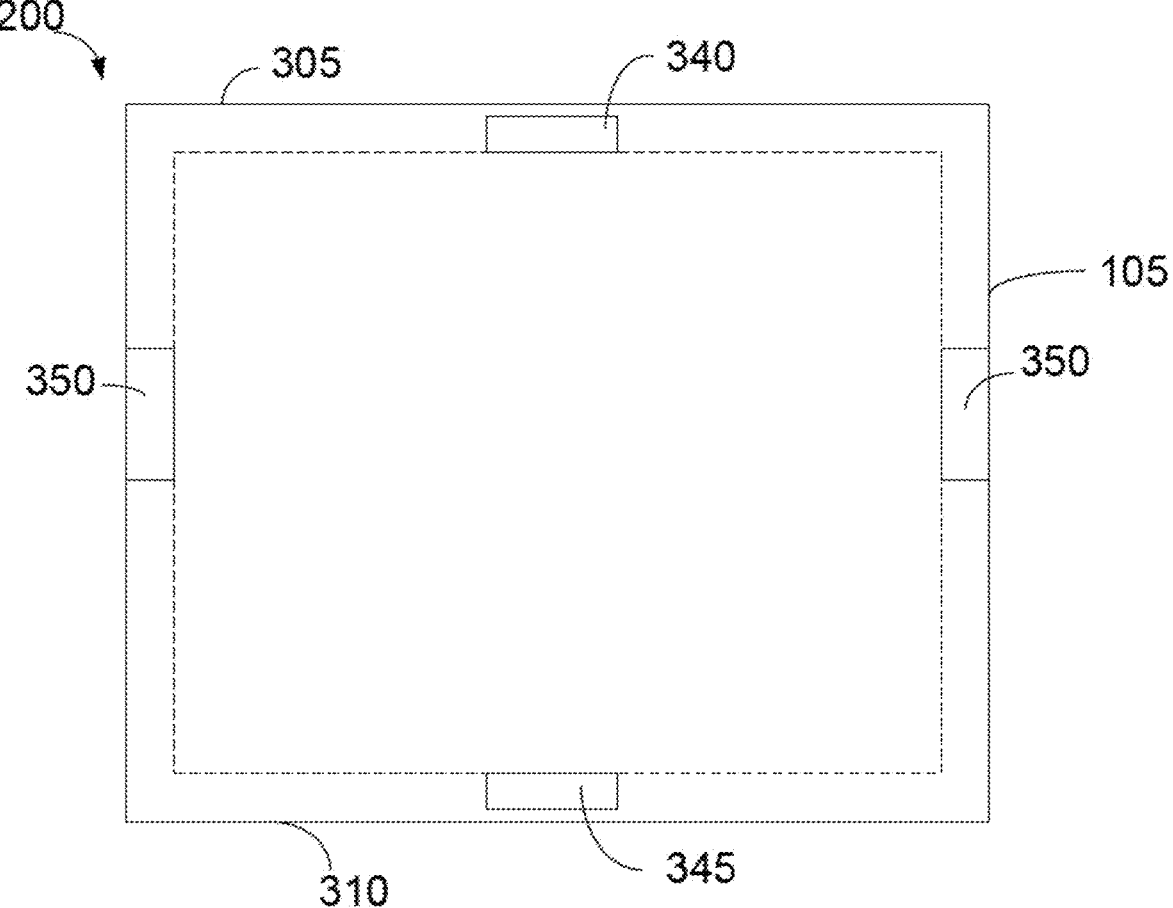
FIG. 3 is a schematic front view illustration of an insulated glazing unit in accordance with the present disclosure.

FIG. 3 is a schematic front view illustration of an insulated glazing unit in accordance with the present disclosure. As can be seen in FIG. 3, the IGU can include one or more sensors 340 and feedthrough area 350 for the wiring of each sensor. The feedthrough area 350 can carry current from outside the seal to inside the seal area of the IGU. The one or more sensors 340 can include that include 180 degree sensors. Each sensor 340 can have a range from 45 to 180 degrees. Each sensor 340 can be spaced in various locations within the hermetically sealed space created by the spacer 115, the first panel 105, and the second panel 110. In one embodiment, a first sensor 340 can be on a first side 305 of the first panel 105, and a second sensor 345 can be on a second side 310, where the first side 305 is opposite and parallel to the second side 310. In another embodiment, a sensor 340 can be on every side of the first panel 105 or second panel 110, or combination on each of the first panel 105 and the second panel 110. In one embodiment, the IGU can include one or more sensors, such as at least 2 sensors, at least 4 sensors, or at least 8 sensors. In one embodiment, the device can include no more than 30 sensors 340. Each sensor 340 can return measurements on LUX, temperature, irradiance, direction, levels of light, weather measurements, and more. Each sensor 340 can send information nearly continuously, such as from a motion sensor, light sensor, or the like, on a periodic basis, such as once a minute, every ten minutes, hourly, or the like, or a combination thereof. This information may be contained within information provided by the building management system, or an external source.

The IGU can include a compass to orient the one or more sensors 240. In one embodiment, the sensor 240 can be powered by either 24 V or power over Ethernet (POE). By combining the data from the plurality of sensors 240, the IGU can receive data from a full field of view. In one embodiment, data from a single sensor can be taken. As such, the device can receive data from between a 5 degree and 360 degree field of view based from a central point of the IGU. Each sensor 240 can include one or more filters and may or may not be visible through the outer covering. Each sensor 240 can also include information corresponding to information that can include a light intensity, an occupancy of a controlled space corresponding to the window, a physical configuration of the controlled space, a temperature, a sun position, color rendering information, a time of day, a calendar day, an elapsed time since a scene has been changed, heat load within the controlled space, a contrast level between relatively bright and relatively dark objects within a field of view where an occupant is normally situated within the controlled space, whether an orb of the sun is in the field of view where the occupant is normally situated within the controlled space, whether a reflection of the sun is in the field of view where the occupant is normally situated within the controlled space, a level of cloudiness, or another suitable parameter, or any combination thereof. The controlled space can be an area surrounding a window of the EC device. The controlled spaced may be a room, such as a meeting room or an office, or may be part of a floor of a building. The EC device can then affect light, glare, or temperature of the controlled space.

Figure 4:
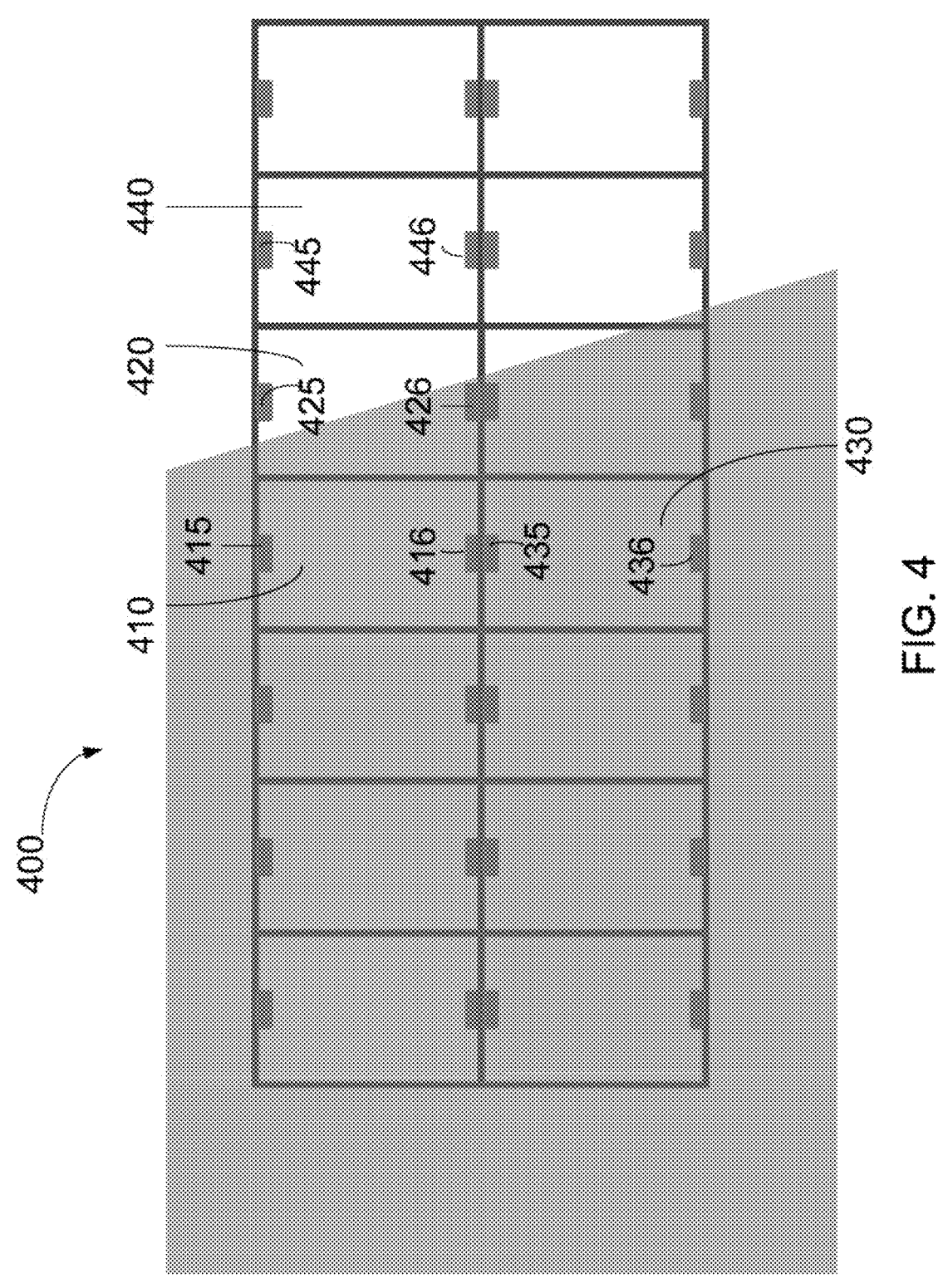
FIG. 4 is a schematic front view of a plurality of insulated glazing units in accordance with alternative embodiments of the present disclosure.

FIG. 4 is a schematic front view of a plurality of insulated glazing units in accordance with alternative embodiments of the present disclosure. In one embodiment, as seen in FIG. 4, a façade 400 can include one or more insulated glazing units, as described above. A first IGU 410 can include a first sensor 415 and a second sensor 416, a second IGU 420 can include a first sensor 425 and a second sensor 426, a third IGU 430 can include a first sensor 435 and a second sensor 436, and a fourth IGU 440 can include a first sensor 445 and a second sensor 446. As can be seen in FIG. 4, the sensors 410, 420, 430, and 440 can be used to determine the temperature and other weather information across the façade. For example, the sensors 415, 416, 435, 436, and 426 are within a shaded area while sensors 425, 445, and 446 are in a sunny area. As such, the difference in temperature, glare, and light information received from the sensors can be used to then shade the IGUs in the sunny area, such as IGU 420 and 440 or let more light into the shaded area, such as IGUs 410 and 430.

Figure 5:
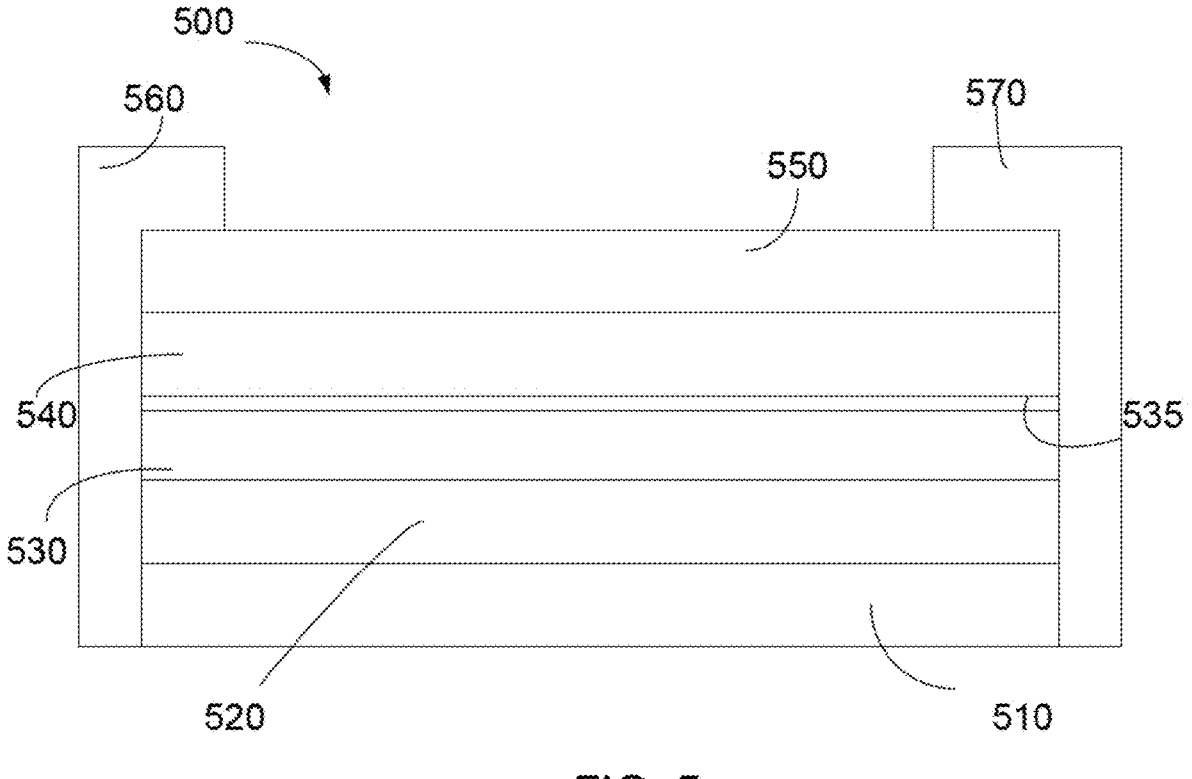
FIG. 5 is a schematic cross-section of an electrochromic device that can be part of an insulated glazing unit.

FIG. 5 is a schematic cross-section of an electrochemical device 500 with an improved film structure, in accordance with an embodiment of the present disclosure. The electrochemical device 500 can be used in the IGU of FIGS. 1-4. For purposes of illustrative clarity, the electrochemical device 500 is a variable transmission device. In one embodiment, the electrochemical device 500 can be an electrochromic device. In another embodiment, the electrochemical device 500 can be a thin-film battery. However, it will be recognized that the present disclosure is similarly applicable to other types of scribed electroactive devices, electrochemical devices, as well as other electrochromic devices with different stacks or film structures (e.g., additional layers). With regard to the electrochemical device 500 of FIG. 5, the device 500 may include a substrate 510, a first transparent conductor layer 520, a cathodic electrochemical layer 530, an anodic electrochemical layer 540, and a second transparent conductor layer 550.

The substrate 510 can include a material selected from the group consisting of a glass substrate, a sapphire substrate, an aluminum oxynitride (AlON) substrate, a spinel substrate, or a transparent polymer. In another embodiment, the substrate 510 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 510 may or may not be flexible. In a particular embodiment, the substrate 510 can be float glass or a borosilicate glass and have a thickness in a range of 0.5 mm to 12 mm thick. The substrate 510 may have a thickness no greater than 16 mm, such as 12 mm, no greater than 10 mm, no greater than 8 mm, no greater than 6 mm, no greater than 5 mm, no greater than 3 mm, no greater than 2 mm, no greater than 1.5 mm, no greater than 1 mm, or no greater than 0.01 mm.

In a particular embodiment, the transparent substrate 510 can include ultra-thin glass that is a mineral glass having a thickness in a range of 50 microns to 300 microns. In another embodiment, the laminate can include a solar control layer that reflects ultraviolet radiation or a low emissivity material.

In an embodiment, the transparent substrate 510 can be a glass substrate that can be a mineral glass including $SiO_2$ and one or more other oxides. Such other oxides can include $Al_2O_3$, an oxide of an alkali metal, an oxide of an alkaline earth metal, $B_2O_3$, $ZrO_2$, $P_2O_5$, $ZnO$, $SnO_2$, $SO_3$, $As_2O_2$, or $Sb_2O_3$. The transparent substrate 510 may include a colorant, such as oxides of iron, vanadium, titanium, chromium, manganese, cobalt, nickel, copper, cerium, neodymium, praseodymium, or erbium, or a metal colloid, such as copper, silver, or gold, or those in an elementary or ionic form, such as selenium or sulfur. In an embodiment in which the transparent substrate 510 is a glass substrate, the glass substrate is at least 50 wt % $SiO_2$. In some applications, the glass substrate 510 is desired to be clear, and thus, the content of colorants is low. In a particular embodiment, the iron content is less than 200 ppm. In an embodiment, the $SiO_2$ content is in a range of 50 wt % to 85 wt %. $Al_2O_3$ may help with scratch resistance, for example, when the major surface is along an exposed surface of the laminate being formed. When present, $Al_2O_3$ content can be in a range of 1 wt % to 20 wt %.

The glass substrate 510 can include heat-strengthened glass, tempered glass, partially heat-strengthened or tempered glass, or annealed glass. "Heat-strengthened glass" and "tempered glass," as those terms are known in the art, are both types of glass that have been heat treated to induce surface compression and to otherwise strengthen the glass. Heat-treated glasses are classified as either fully tempered or heat-strengthened. The term "annealed glass" means glass produced without internal strain imparted by heat treatment and subsequent rapid cooling. Thus, annealed glass only excludes heat-strengthened glass or tempered glass. The glass substrate 510 can be laser cut.

Transparent conductive layers 520 and 550 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 520 and 550 can include gold, silver, copper, nickel, aluminum, or any combination thereof. The transparent conductive layers 520 and 550 can include indium oxide, indium tin oxide, doped indium oxide, tin oxide, doped tin oxide, zinc oxide, aluminum zinc oxide, doped zinc oxide, ruthenium oxide, doped ruthenium oxide and any combination thereof. The transparent conductive layers 520 and 550 can have the same or different compositions. The transparent conductive layers 520 and 550 can have a thickness between 10 nm and 600 nm. In one embodiment, the transparent conductive layers 520 and 550 can have a thickness between 200 nm and 500 nm. In one embodiment, the transparent conductive layers 520 and 550 can have a thickness between 320 nm and 460 nm. In one embodiment the first transparent conductive layer 520 can have a thickness between 10 nm and 600 nm. In one embodiment, the second transparent conductive layer 550 can have a thickness between 80 nm and 600 nm. In one embodiment, the transparent conductive layer 120 overlies the substrate 510.

The layers 530 and 540 can be electrode layers, wherein one of the layers may be a cathodic electrochemical layer, and the other of the layers may be an anodic electrochromic layer (also referred to as a counter electrode layer). In one embodiment, the cathodic electrochemical layer 530 can be an electrochromic layer. The cathodic electrochemical layer 530 can include an inorganic metal oxide material, such as $WO_3$, $V_2O_5$, $MoO_3$, $Nb_2O_5$, $TiO_2$, CuO, $Ni_2O_3$, NiO, $Ir_2O_3$, $Cr_2O_3$, $CO_2O_3$, $Mn_2O_3$, mixed oxides (e.g., W—Mo oxide, W—V oxide), or any combination thereof and can have a thickness in a range of 40 nm to 600 nm. In one embodiment, the cathodic electrochemical layer 530 can have a thickness between 100 nm to 500 nm. In one embodiment, the cathodic electrochemical layer 530 can have a thickness between 300 nm to 500 nm. The cathodic electrochemical layer 530 can include lithium, aluminum, zirconium, phosphorus, nitrogen, fluorine, chlorine, bromine, iodine, astatine, boron; a borate with or without lithium; a tantalum oxide with or without lithium; a lanthanide-based material with or without lithium; another lithium-based ceramic material; or any combination thereof.

The counter electrode layer 540 can include any of the materials listed with respect to the cathodic electrochromic layer 530 or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 40 nm to 500 nm. In one embodiment, the counter electrode layer 540 can have a thickness between 150 nm to 300 nm. In one embodiment, the counter electrode layer 540 can have a thickness between 250 nm to 290 nm. In some embodiments, lithium may be inserted into at least one of the first electrode 530 or second electrode 540. In another embodiment, a mobile element may be inserted into both the first electrode 530 and the second electrode 540. The mobile element can migrate to and provide color for either the electrochromic layer 530 or the counter electrode layer 540 as the electrochromic device changes from a clear to tinted state. In one embodiment, the mobile element can be deposited on the first transparent conductive layer 520—prior to any other layer deposition—and then migrate to the first electrode 530. In another embodiment, the mobile element can be deposited after an adhesion layer and migrate to the second electrode 540. The mobile element can include silver, sodium, hydrogen, lithium, or any combination therein.

In another embodiment, a separate lithiation operation, such as sputtering lithium, may be performed. In one embodiment, the lithium may be co-sputtered with the electrochromic layer 530 using a lithium target. In another embodiment, the lithium may be sputtered with the electrochromic layer 530 using a lithium tungsten oxide target. In such a lithiation operation, the thickness of the lithium may be between $1\,\mu g/cm^2$ and $10\,\mu g/cm^2$. In one embodiment, the lithiation operation may be performed before the deposition of the electrochemical layer 530. In another embodiment, the lithation operation may be performed after the deposition of the counter electrode layer 540. For example, a lithium layer may be deposited in between the first transparent conductive layer 520 and the electrochemical layer 530. In another embodiment, a lithium layer can be deposited after the second transparent conductive layer 550. In yet another embodiment, the lithium layer can be deposited in combination with an intermediate layer such that the lithium is not in direct contact with either the electrochemical layer 530 or the counter electrode layer 540. In such an example, the intermediate layer can have a composition that allows the lithium to migrate to and lithiate the electrochemical layer 530 and/or the counter electrode layer 540. In one embodiment, the intermediate layer can be the adhesion layer described below. In another embodiment, the adhesion layer can include a material selected from the group consisting of a silicate, an aluminum silicate, an aluminum borate, a borate, a zirconium silicate, a niobate, a borosilicate, a phosphosilicate, a nitride, an aluminum fluoride, and another suitable ceramic material. In one embodiment, the lithium layer can be between the electrochemical layer 530 and the counter electrode layer 540 without being in direct contact with either the electrochemical layer 530 or the counter electrode layer 540.

An electrolyte layer 535 can be between the electrochromic layer 530 and the counter electrode layer 540. The electrolyte layer 535 includes a solid electrolyte that allows ions to migrate through the electrolyte layer 535 as an electrical field across the electrolyte layer is changed from the high transmission state to the low transmission state, or vice versa. In an embodiment, the electrolyte layer 535 can be a ceramic electrolyte. In another embodiment, the electrolyte layer 535 can include a silicate-based or borate-based material. The electrolyte layer 535 may include a silicate, an aluminum silicate, an aluminum borate, a borate, a zirconium silicate, a niobate, a borosilicate, a phosphosilicate, a nitride, an aluminum fluoride, or another suitable ceramic material. Other suitable ion-conducting materials can be used, such as tantalum pentoxide or a garnet or perovskite material based on a lanthanide-transition metal oxide. In another embodiment, as formed, the electrolyte layer 535 may include mobile ions. Thus, lithium-doped, or lithium-containing compounds of any of the foregoing may be used. Alternatively, a separate lithiation operation, such as sputtering lithium, may be performed. In such a lithiation operation, the thickness of the lithium may be between 1 $\mu g/cm^2$ and 10 $\mu g/cm^2$. The electrolyte layer 535 may include a plurality of layers having alternating or differing materials, including reaction products between at least one pair of neighboring layers. The thickness of the electrolyte layer 535 can be in a range of 1 nm to 20 nm. The electrolyte layer 535 may have a thickness of no greater than 10 nm, such as no greater than 5 nm, no greater than 4 nm, no greater than 3 nm, no greater than 2 nm, or no greater than 1 nm.

In another embodiment, the device 500 may include a plurality of layers between the substrate 510 and the first transparent conductive layer 520. In one embodiment, an antireflection layer is between the substrate 510 and the first transparent conductive layer 520. The antireflection layer can include $SiO_2$, $NbO_2$, and can be a thickness between 20 nm to 100 nm. The device 500 may include at least two bus bars. A bus bar 560 can be electrically connected to the first transparent conductive layer 520 and a bus bar 570 can be electrically connected to the second transparent conductive layer 550.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. An insulated glazing unit, including: a first panel; a second panel; an electrochromic device coupled to the first panel; a spacer between the first panel and the second panel; and one or more sensors within the spacer between the first panel and the second panel.

Embodiment 2. An insulated glazing unit, including: a first panel; a second panel; an electrochromic device coupled to the first panel; a spacer between the first panel and the second panel; one or more sensors within the spacer between the first panel and the second panel; and one or more obscuration films between the one or more sensors and the first panel.

Embodiment 3. The insulated glazing unit of embodiment 1, where the sensor is closer to the second panel than to the first panel.

Embodiment 4. The insulated glazing unit of embodiment 1, where the insulated glazing unit includes a first sensor on a first side of the first panel and a second sensor on a second side of the second panel, wherein the first panel is opposite and parallel to the second panel.

Embodiment 5. The insulated glazing unit of embodiment 1, further including one or more obscuration films between the sensor and the first panel.

Embodiment 6. The insulated glazing unit of embodiment 5, where each obscuration film has an area that is less than an area of the sensor.

Embodiment 7. The insulated glazing unit of embodiment 5, where each obscuration film has an area that is more than an area of the sensor.

Embodiment 8. The insulated glazing unit of embodiment 5, where each sensor has a width that is greater than a width of each obscuration film.

Embodiment 9. The insulated glazing unit of embodiment 1, where the one or more sensors are within a sealed space defined by the spacer, the first panel, and the second panel.

Embodiment 10. The insulated glazing unit of embodiment 1, where the one or more sensors are configured to measure LUX, temperature, irradiance, direction, levels of light, and weather conditions.

Embodiment 11. The insulated glazing unit of embodiment 1, where the sensor is closer to the first panel than to the second panel.

Embodiment 12. The insulated glazing unit of any one of the preceding embodiments, where the electrochromic device, includes: a first transparent conductive layer; a second transparent conductive layer; an electrochromic layer between the first transparent conductive layer and the a second transparent conductive layer; a counter electrode layer between the first transparent conductive layer and the a second transparent conductive layer; and an electrolyte layer between the electrochromic layer and the counter electrode layer.

Embodiment 13. The insulated glazing unit of embodiment 12, where the substrate includes a material selected from the group consisting of glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

Embodiment 14. The insulated glazing unit of embodiment 12, where the first transparent conductive layer includes a material selected from the group consisting of indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Embodiment 15. The insulated glazing unit of embodiment 12, where the second transparent conductive layer includes a material selected from the group consisting of indium oxide, indium tin oxide, doped indium oxide, tin oxide, doped tin oxide, zinc oxide, doped zinc oxide, ruthenium oxide, doped ruthenium oxide and any combination thereof.

Embodiment 16. The insulated glazing unit of embodiment 12, where the anodic electrochemical layer includes an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide ($NiO$, $Ni_2O_3$, or combination of the two), and Li, nitrogen, Na, H, or another ion, any halogen, or any combination thereof.

Embodiment 17. The insulated glazing unit of embodiment 12, where the electrochromic layer includes a material selected from the group consisting of $WO_3$, $V_2O_5$, $MoO_3$, $Nb_2O_5$, $TiO_2$, $CuO$, $Ni_2O_3$, $NiO$, $Ir_2O_3$, $Cr_2O_3$, $Co_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the embodiments.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An insulated glazing unit, comprising:
a first panel;
a second panel;
an electrochromic device coupled to the first panel, wherein the electrochromic device has a viewing area;
a spacer between the first panel and the second panel;
one or more sensors within the space between the first panel and the second panel, wherein the one or more sensors are closer to the first panel than the second panel and within the viewing area of the electrochromic device; and
an obscuration film between the one or more sensors and the electrochromic device.

2. The insulated glazing unit of claim 1, wherein the insulated glazing unit comprises a first sensor on a first side of the first panel and a second sensor on a second side of the second panel, wherein the first panel is opposite and parallel to the second panel.

3. The insulated glazing unit of claim 1, further comprising one or more obscuration films between the sensor and the first panel.

4. The insulated glazing unit of claim 3, wherein each obscuration film has an area that is less than an area of the sensor.

5. The insulated glazing unit of claim 3, wherein each obscuration film has an area that is more than an area of the sensor.

6. The insulated glazing unit of claim 3, wherein each sensor has a width that is greater than a width of each obscuration film.

7. The insulated glazing unit of claim 1, wherein the one or more sensors are within a sealed space defined by the spacer, the first panel, and the second panel.

8. The insulated glazing unit of claim 1, wherein the one or more sensors are configured to measure LUX, temperature, irradiance, direction, levels of light, and weather conditions.

9. The insulated glazing unit of claim 1, wherein the sensor is closer to the first panel than to the second panel.

10. An insulated glazing unit, comprising:
a first panel;
a second panel;
an electrochromic device coupled to the first panel, wherein the electrochromic device comprises a viewing area;
a spacer between the first panel and the second panel;
one or more sensors within the spacer between the first panel and the second panel; and
one or more obscuration films between the one or more sensors and the first panel, wherein the one or more sensors are closer to the first panel than the second panel and within the viewing area of the electrochromic device and
an obscuration film between the one or more sensors and the electrochromic device.

11. The insulated glazing unit of claim 10, wherein the insulated glazing unit comprises a first sensor on a first side of the first panel and a second sensor on a second side of the second panel, wherein the first panel is opposite and parallel to the second panel.

12. The insulated glazing unit of claim 10, further comprising one or more obscuration films between the sensor and the first panel.

13. The insulated glazing unit of claim 10, wherein the electrochromic device, comprises:
a first transparent conductive layer;
a second transparent conductive layer;
an electrochromic layer between the first transparent conductive layer and the second transparent conductive layer;
a counter electrode layer between the first transparent conductive layer and the second transparent conductive layer; and
an electrolyte layer between the electrochromic layer and the counter electrode layer.

14. The insulated glazing unit of claim 13, wherein the substrate comprises a material selected from the group consisting of glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

15. The insulated glazing unit of claim 13, wherein the first transparent conductive layer comprises a material selected from the group consisting of indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

16. The insulated glazing unit of claim 13, wherein the second transparent conductive layer comprises a material selected from the group consisting of indium oxide, indium tin oxide, doped indium oxide, tin oxide, doped tin oxide, zinc oxide, doped zinc oxide, ruthenium oxide, doped ruthenium oxide and any combination thereof.

17. The insulated glazing unit of claim 13, wherein the anodic electrochemical layer comprises an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide ($NiO$, $Ni_2O_3$, or combination of the two), and Li, nitrogen, Na, H, or another ion, any halogen, or any combination thereof.

18. The insulated glazing unit of claim 13, wherein the electrochromic layer comprises a material selected from the group consisting of $WO_3$, $V_2O_5$, $MoO_3$, $Nb_2O_5$, $TiO_2$, $CuO$, $Ni_2O_3$, $NiO$, $Ir_2O_3$, $Cr_2O_3$, $Co_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

\* \* \* \* \*